United States Patent [19]

Ohsakai

[11] Patent Number: 4,995,970
[45] Date of Patent: Feb. 26, 1991

[54] STEERING FORCE CONTROL APPARATUS FOR POWER STEERING SYSTEM

[75] Inventor: Hiroshi Ohsakai, Saitama, Japan

[73] Assignee: Jidosha Kiki Co., Ltd., Tokyo, Japan

[21] Appl. No.: 381,217

[22] Filed: Jul. 17, 1989

[30] Foreign Application Priority Data

Jul. 29, 1988 [JP] Japan .................. 63-189849

[51] Int. Cl.$^5$ .......................................... B01D 35/02
[52] U.S. Cl. .................. 210/167; 210/232; 210/416.5; 210/428; 210/432; 210/433.1; 210/451; 210/453; 210/497.01; 180/141; 60/454; 137/549
[58] Field of Search ............ 210/167, 168, 171, 416.1, 210/416.5, 428, 432, 437, 451–453, 485, 497.01, 232, 236, 433.1, 445, 449, 454, 460, 461; 180/142, 143; 137/549; 60/454

[56] References Cited

U.S. PATENT DOCUMENTS

| | | | |
|---|---|---|---|
| 3,193,102 | 7/1965 | Bottoms et al. | 210/428 |
| 4,133,768 | 1/1979 | Theriot | 210/452 |
| 4,459,208 | 7/1984 | Lemon | 210/171 |
| 4,471,796 | 9/1984 | Sonoda et al. | 137/549 |
| 4,787,469 | 11/1988 | Yoshida et al. | 180/142 |
| 4,790,401 | 12/1988 | Sonada | 180/142 |

FOREIGN PATENT DOCUMENTS 62-25265 2/1987 Japan .
63-68467 3/1988 Japan .

Primary Examiner—W. Gary Jones
Assistant Examiner—Matthew Savage
Attorney, Agent, or Firm—Townsend & Townsend

[57] ABSTRACT

A steering force control apparatus for a power steering system includes a hydraulic path, a branch path, and a cylindrical filter. The hydraulic path extends from a pump to a power steering side. The branch path has one end open to a wall midway along the hydraulic path and extends to a hydraulic reaction mechanism. The cylindrical filter is adjacent to the wall of the hydraulic path and has a mesh portion for filtering a pressurized oil. The mesh portion is formed at a portion of the cylindrical filter at which the hydraulic path communicates with the branch path. The portion of the filter at which the hydraulic path communicates with the branch path has a tapered stepped portion mechanically formed at the downstream side of the branch path. The cylindrical filter has upper and lower ring frame members to be fitted in the hydraulic path. The lower ring frame member is formed to have an outer diameter smaller than that of the upper ring frame member. The lower ring frame member has a tapered portion which is formed at a bottom portion of the lower ring frame member so as to be inclined inwardly in accordance with the tapered stepped portion of the hydraulic path, and a small-diameter portion extending from the tapered portion to the downstream side thereof.

5 Claims, 4 Drawing Sheets

STEERING FORCE CONTROL APPARATUS FOR POWER STEERING SYSTEM

BACKGROUND OF THE INVENTION

The present invention relates to an improvement in a power steering control apparatus, used for a power steering system, for controlling a hydraulic reaction mechanism in accordance with the traveling velocity, the steering angle, and the like of a vehicle so as to obtain a desired steering force.

In power steering systems for reducing the steering wheel operating force (steering force) of a vehicle, various steering force control apparatuses for performing steering force control in accordance with various traveling conditions such as the traveling velocity and the steering angle of the vehicle by using hydraulic reaction mechanisms have been proposed. That is, a steering force needs to be controlled such that a light steering operation is allowed during parking or low-speed travel, and a steering operation is performed with a sense of rigidity during high-speed travel so as to ensure stability in straight travel. In order to perform such steering force control, input and output shafts in a power steering system are relatively rotated or restricted by using a reaction piston for selectively restricting the rotation of the input and output shafts in accordance with the magnitude of a reaction oil pressure.

As the most popular conventional steering force control apparatus of this type used for a power steering system, an apparatus having an arrangement disclosed in, e.g., Japanese Utility Model Laid-Open No. 62-25265 is known. In this arrangement, a reaction oil pressure branched from a part of a main hydraulic path extending to a power cylinder through a flow switching valve is used, and this pressure is controlled by a reaction oil power control valve constituted by a spool valve or the like to be guided to a hydraulic reaction chamber for driving a reaction piston.

According to steering power control apparatus having such a conventional arrangement, a filter for filtering a pressurized oil is generally arranged with respect to a branch portion of a branch path extending from a main hydraulic path to a hydraulic reaction chamber so as to prevent dust and foreign substances from entering a hydraulic reaction system. In this case, problems have been posed in terms of the shape and installation structure of the filter. More specifically, as shown in FIG. 10, the above-described branch portion extending from the main hydraulic path to the hydraulic reaction chamber is constituted by a path hole 2 serving as the main hydraulic path mechanically perforated in a steering body 1 and a path hole 3 serving as the branch path which is formed on the hydraulic reaction side so as to communicate with the hole 2. A substantially cylindrical filter 4 is fitted in a portion on the bottom side of the main path side path hole 2. Referring to FIG. 10, reference symbols 4a and 4b denote upper and lower ring-like frame members coupled to each other through a plurality of coupling pieces 4c and constituting the filter 4; and 4d, a cylindrical mesh portion mounted on the coupling pieces 4c between the upper and lower frame members 4a and 4b. A pressurized oil on the main path 2 side is filtered by the mesh portion 4d and is guided to the branch path 3 side. Reference numeral 5 denotes an inlet port pipe, inserted from above the upper portion of the path hole 2, for connecting a hydraulic pipe from a pump P (not shown); and 6, a small-diameter outlet side path hole which is formed to be continuous with the bottom side of the path hole 2 constituting the main path and extends to a power cylinder PS through a flow switching valve (not shown). In addition, reference symbol 2a denotes a tapered stepped outlet portion constituting the bottom portion of the path hole 2 when the path hole 2 is formed by a mechanical process using a drill or the like.

According to such a conventional structure, since the filter 4 is arranged in a space having a limited axial length between the upper side of the tapered portion 2a on the path hole 2 bottom side and the inner end of the inlet port pipe 5, the axial length of the filter 4 itself is limited. Since a sufficient axial length cannot be ensured between the upper and lower ring-like frame members 4a and 4b, the filter area of the mesh portion 4d is decreased, and required filter performance cannot be ensured. For this reason, a maintenance operation such as replacement of a filter due to clogging or the like must be frequently performed. In addition, according to the filter 4 having such a small filter area, a space of a sufficient volume cannot be ensured between the mesh portion 4d and the hole wall of the path hole 2 to which the path hole 3 around the mesh portion 4d is open, and a pressure loss is increased at this portion. As a result, a pressure to be supplied to the hydraulic reaction system is reduced, and problems are posed when a desired hydraulic reaction control is to be performed. Especially, if such a pressure loss is increased, the internal pressure of the filter 4 is increased, thereby posing problems that the mesh portion 4d is deformed outwardly, and the volume of a portion defined by the outer surface of the mesh portion 4d is decreased.

As described above, in the conventional filter structure, the upper and lower ring-like frame members 4a and 4b must have diameters substantially equal to the inner diameter of the path hole 2, and an operation of sequentially urging them into the path hole 2 to be assembled is required. Since the assembly operation is performed by urging the lower ring-like frame member 4b in the path hole 2 from its upper end side, the filter 4 tends to be deformed in the axial direction.

Especially, in a control spool valve or the like used in the above-described hydraulic reaction system, since a path system or the like has a small diameter, clogging tends to occur. Therefore, entrance of dust, foreign substances, and the like whose sizes pose no problem in the main hydraulic path extending from a pump to a power cylinder must be reliably prevented. In addition, when a filter is to be arranged in the branch portion extending from the main path to the hydraulic reaction control system, limitations in axial length pose problems in terms of filter areas and assembly performance as described above. Therefore, demands have arisen for a countermeasure by which all the above-described problems can be solved.

For example, Japanese Patent Laid-Open No. 63-38467 discloses a reaction oil pressure control valve used for the above-described hydraulic reaction control system. In such a steering power control apparatus, a choke portion is arranged on a main hydraulic path on the downstream side of a branch portion extending to a hydraulic reaction system. Therefore, a constant preset pressure is applied to the hydraulic reaction system to provide some rigidity to a steering wheel during straight travel or the like. Such a choke portion is conventionally arranged on the above-described main path portion on the downstream side of the filter portion. In this case, however, since the axial length of the filter portion is undesirably limited, problems are posed in formation of a required choke portion. More specifically, if the required choke portion is arranged on the downstream side of the filter portion, the height of the choke portion is further limited with respect to the filter. If a sufficiently long filter length is ensured, a sufficient length of the choke portion cannot be ensured. Therefore, a large choking amount is required. As a result, the flow of an oil pressure on the main path is disturbed, and other problems may be posed. Demands have arisen for a countermeasure by which these problems can also be solved.

SUMMARY OF THE INVENTION

It is an object of the present invention to provide a steering force control apparatus wherein the filter effect of a filter for preventing dust, foreign substances, and the like whose sizes pose no problem in a main hydraulic path extending from a pump to a power cylinder from entering a hydraulic reaction system can be increased in a limited space.

In order to achieve the above object, there is provided a steering force control apparatus for a power steering system, comprising, a hydraulic path extending from a pump to a power steering side, a branch path having one end open to a wall midway along the hydraulic path and extending to a hydraulic reaction mechanism, and a cylindrical filter adjacent to the wall of the hydraulic path and having a mesh portion for filtering a pressurized oil, the mesh portion being formed at a portion of the cylindrical filter at which the hydraulic path communicates with the branch path, wherein the portion of the filter at which the hydraulic path communicates with the branch path has a tapered stepped portion mechanically formed at the downstream side of the branch path, and the cylindrical filter has upper and lower ring frame members to be fitted in the hydraulic path, the lower ring frame member being formed to have an outer diameter smaller than that of the upper ring frame member, and has a tapered portion which is formed at a bottom portion of the lower ring frame member so as to be inclined inwardly in accordance with the tapered stepped portion of the hydraulic path, and a small-diameter portion extending from the tapered portion to the downstream side thereof.

According to the present invention, the lower ring frame member constituting a cylindrical filter is pushed into the path hole from the above in a loosely fitted state, only the upper ring frame member is urged into the path hole to be assembled while the tapered portion of the lower frame member is brought into contact with the tapered portion of the bottom portion of the path hole, and the small-diameter portion of the lower frame member located below the tapered portion is fitted in the small-diameter path hole continuously formed with the lower portion of the path hole. That is, the filter can be arranged in the space whose axial length is greatly limited while the filter area defined by the filter mesh portion is maximized. If a choke portion is integrally formed with the lower portion of such a filter, a perforation process requiring high precision or a large space becomes unnecessary.

DETAILED DESCRIPTION OF THE PREFERRED EMBODIMENTS

Figure 1:
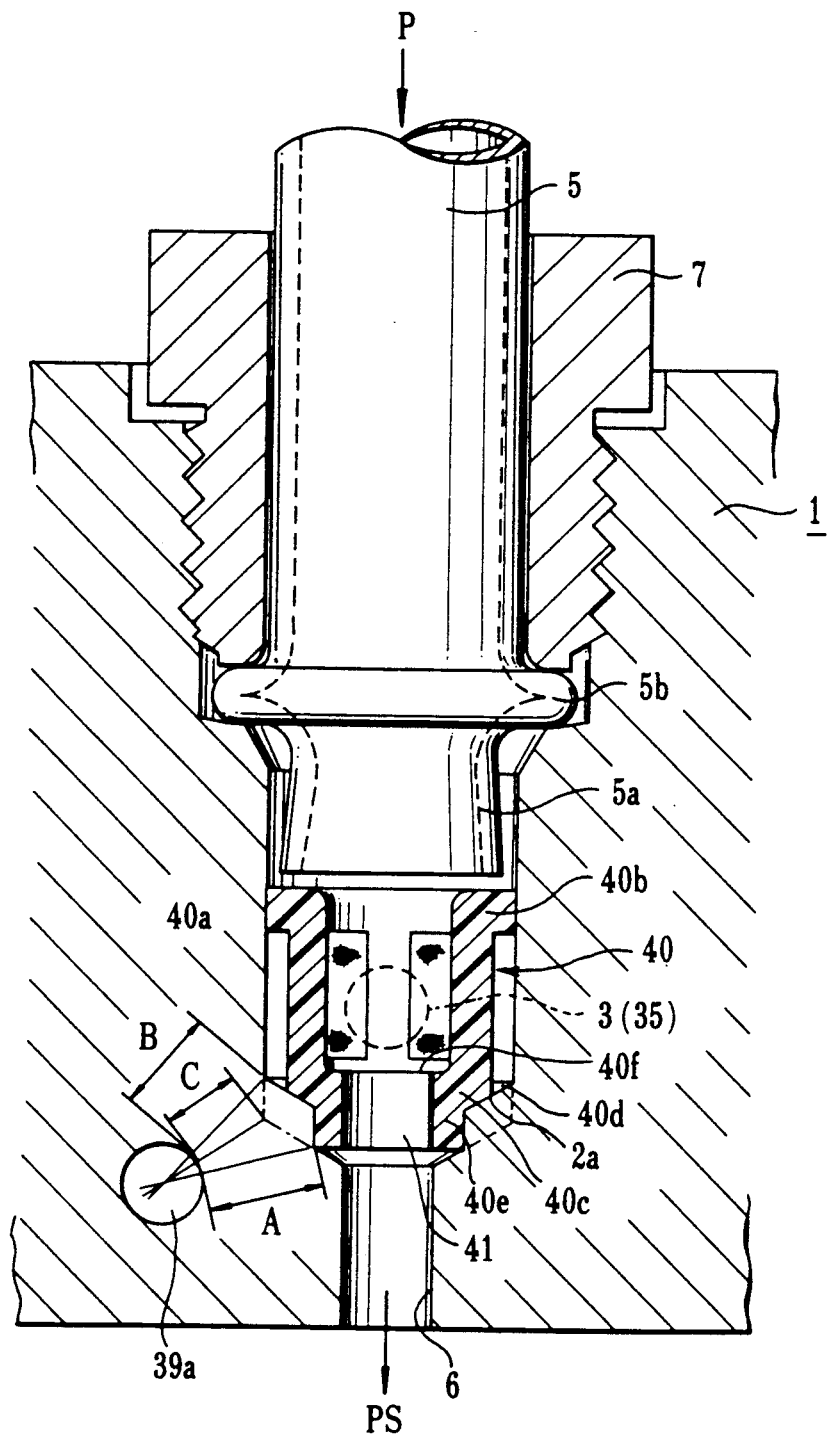
FIG. 1 is an enlarged sectional view showing a main part of a steering force control apparatus for a power steering system according to an embodiment of the present invention.
Figure 2:
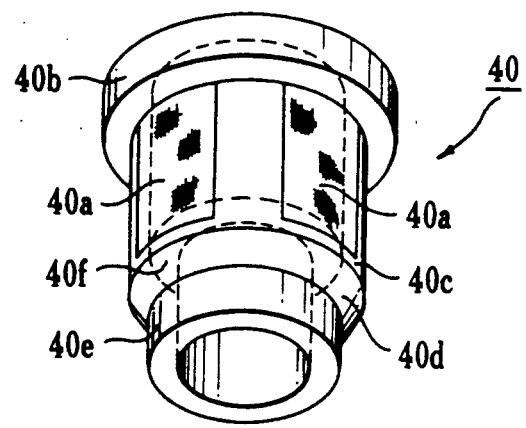
FIG. 2 is a schematic perspective view showing a cylindrical filter.
Figure 4:
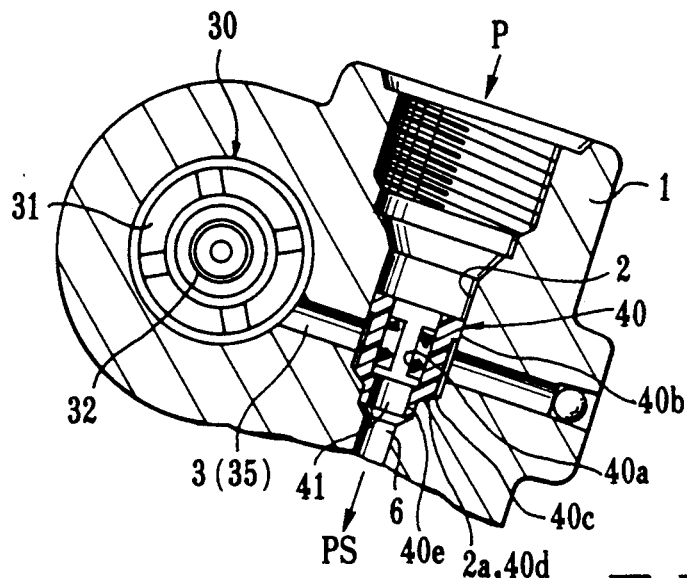
FIG. 4 is a sectional view taken along a line IV—IV in FIG. 3.

FIGS. 1 to 5 show a steering force control apparatus for a power steering system according to an embodiment of the present invention. Schematic arrangements of a power steering main body denoted by reference numeral 10 and a steering force control apparatus denoted by reference numeral 11 in a power steering system will be described first with reference to FIGS. 3 to 5. Reference numeral 12 denotes an input shaft (stub shaft) coupled to a steering wheel side (not shown); and 13, an output shaft (pinion shaft) coupled to the left end side of the input shaft 12 through a torsion bar 14 and having a pinion to be meshed with a rack 15 constituting a steering link mechanism (not shown). These shafts 12 and 13 are properly rotated in a steering direction. In this case, a known fail-safe mechanism is arranged between the shafts 12 and 13. When the fail-safe mechanism is pivoted through a predetermined angle or more and is brought into contact with the shafts 12 and 13, the shafts 12 and 13 are coupled to each other.

In a body 1 constituting the power steering main body, a rotor 17 and a sleeve 18 constituting a rotary flow path switching valve 16 are integrally formed with the shafts 12 and 13, respectively. Flow path switching between an oil pump P, an oil tank t, and the left and right cylindrical chambers (C1 and C2) of a power cylinder PS is performed by a relative rotational displacement of the rotor 17 and the sleeve 18. The arrangement and operation of the rotary flow path switching valve 16 described above have been known, and hence a detailed description thereof will be omitted.

Reference numeral 20 denotes a hydraulic reaction unit constituting a part of the steering force control apparatus 11 arranged between the input and output shafts 12 and 13 integrally formed with the rotor 17 and the sleeve 18 constituting the flow path switching valve 16. The hydraulic reaction unit 20 comprises a plurality of guide holes 21 axially extending through a flange portion formed on the output shaft 13, a plurality of balls 22 held in the guide holes 21 so as to be slidable in only the axial direction, a reaction receiving portion 24 which has engaging recesses 23 of the same number as that of the balls 22, each recess 23 having inclined surfaces on both the sides of the balls 22 in the rotation direction, and which is formed on the input shaft 12 so as to oppose one side surface of the flange portion, a hydraulic reaction chamber 25 formed on the other side of the flange portion, and a ring-like reaction piston 26, slidably held in the hydraulic reaction chamber 25 so as to be coaxial with the input and output shafts 12 and 13, for urging the balls 22 into the engaging recesses 23 of the reaction receiving portion 24 and causing a restricting force corresponding to a reaction oil pressure to act between the input and output shafts 12 and 13. Note that reference numeral 27 denotes a seal member, fitted on the output shaft 13 with a small oil-tight clearance, for sealing the other end side of the hydraulic reaction chamber 25.

In such an arrangement, the balls 22 held in the guide holes 21 on the output shaft 13 side are urged by the right end portion of the reaction piston 26 which is moved rightward in the axial direction by a reaction oil pressure properly applied in accordance with various traveling conditions such as vehicle velocity, so that the balls 22 can be axially urged to be engaged in the engaging recesses 23 of the reaction receiving portion 24 on the input shaft 12 side. As a result, a desired restricting force can be obtained from the reaction oil pressure, relative rotation of the input and output shafts 12 and 13 is properly restricted, and a necessary steering reaction can be obtained to properly perform steering force control. That is, if the input shaft 12 side is rotated during steering, each ball 22 rolls on one of the inclined surfaces of each engaging recess 23 and axially moves by a distance corresponding to the inclination amount of the surface. A reaction generated when the reaction piston 26 is urged at this time is transmitted to the input shaft 12 side as a steering reaction.

A mechanism used as the hydraulic reaction unit 20 is not limited to the structure of the embodiment, and a known conventional hydraulic reaction mechanism can be used.

A hydraulic reaction control mechanism 30 constituting the above-described steering force control apparatus 11 comprises a sleeve 31 fitted in a hole portion 30a in the body 1, a spool 32 slidably arranged in an axial hole of the sleeve 31, and a solenoid 33 coupled to the spool 32 to reciprocate it. An energizing current for the solenoid 33 is controlled by a controller to which detection signals from vehicle velocity and steering angle sensors and the like are input, thereby controlling the position of the spool 32 in the axial direction. A distribution path 34 constituted by an annular groove and a land portion located on the left side thereof is formed in the outer surface of the spool 32. Both the sides of the land portion are tapered. A supply path 35 communicating with the outlet port of the pump P is open to the sliding surface between the sleeve 31 and the spool 32, and communicates with the distribution path 34 through the opening. A reaction path 36 communicating with the hydraulic reaction chamber 25 is open to the sliding surface on the left side of the supply path 35, and communicates with the right side of the distribution path 34 through the opening. In addition, an annular groove 38 constituting a part of a discharge path 37 is formed at a position on the left side of the distribution path 34. The reaction path 36 communicates with the annular groove 38 through a left side portion of the land portion of the distribution path 34. Note that the discharge path 37 communicates with a low-pressure chamber 39 at the right end portion of the spool 32 through an internal path formed therein, and also communicates with a low-pressure side of the flow path switching valve 16 through a path 39a formed in the body 1 so as to be connected to the tank T side. In addition, a low-pressure chamber 39b is formed at the left end portion of the spool 32 and communicates with the tank T through the internal path of the spool 32.

In such an arrangement, while the solenoid is deenergized, e.g., the engine is stopped, the spool 32 is set at the left end position by a spring (not shown) in the solenoid 33. In this state, the flow path area between the reaction path 36 and the supply path 35 is maximized, whereas the flow path area between the reaction path 36 and the discharge path 37 is minimized.

During parking of the vehicle with the engine being started or low-speed travel, the spool 32 is greatly moved to the right end position by the solenoid 33. At this time, the supply side flow path area extending to the hydraulic reaction chamber 25 is minimized, whereas the discharge side flow path area is maximized. As a result, the pressure in the chamber 25 becomes substantially zero, and the steering reaction from the hydraulic reaction mechanism 20 is minimized to enable a light steering operation.

With an increase in vehicle velocity, the spool 32 is gradually moved leftward by the solenoid 33. The supply side flow path area extending to the hydraulic reaction chamber 25 is increased and the discharge side flow path area is decreased in accordance with the movement amount of the spool 32. Therefore, the steering reaction to the steering wheel side is increased during high-speed travel so as to allow a stable steering operation with a sense of rigidity.

As is apparent from FIGS. 1 to 4, the present invention is characterized in that a cylindrical filter 40 made of a resin material or the like, which is arranged at the bottom side of the path hole 2 mechanically formed in the steering body 1 and constituting the hydraulic path extending from the pump P to the power steering PS (the mesh portion 40a, formed on its outer surface, for filtering a pressurized oil flowing to the branch path 3 (35) on the hydraulic reaction side extending to the hydraulic reaction mechanism 20 (hydraulic reaction control mechanism 30) open to the path wall of the path hole 2, is constituted by upper and lower ring frame members 40b and 40c fitted in the path hole 2, the outer diameter of the lower ring frame member 40c is set to be smaller than that of the upper member (40b), and a tapered portion 40d inclined inwardly and seated on the bottom portion of the path hole and a small-diameter portion 40e continuous with the tapered portion 40d and open to the outlet side path hole 6 are formed on the bottom portion of the lower frame member 40c.

That is, according to the present invention, in order to insert and arrange a filter in a space having a length limited in the axial direction with its filter area being maximized, the diameter of the lower ring frame member 40c constituting the cylindrical filter 40 together with the upper ring frame member 40b is set to be smaller than that of the path hole 2, and the tapered portion 40d which has an angle approximate to the angle of a mechanically formed tapered surface 2a of the path hole 2 bottom side so as to be seated thereon is integrally formed with the lower ring frame member 40c. With this arrangement, the filter area of the mesh portion 40a can be increased in the axial direction compared with the conventional structure (see FIG. 9), and the volume of a space defined between the outer surface of the mesh portion 40a and the wall of the path hole 2 can be increased. Therefore, according to the above-described arrangement, the filter area of the cylindrical filter 40 arranged in the space limited in the axial direction between the path hole 6 communicating with the power cylinder PS side and the connecting pipe 5 extending from the pump P side can be increased so that its filtration performance can be increased, and a pressure loss of an oil pressure to be transmitted to the hydraulic reaction system can be minimized as compared with the conventional structure by increasing the volume of the annular space outside the filter mesh portion 40a. As a result, generation of noise can be prevented, and the problem of low sealing performance due to deformation of the mesh portion 40a and the like can be solved.

The problem of a space in which the filter 40 is arranged will be briefly described below with reference to FIG. 1. The connecting pipe 5 extending from the pump P side is inserted in the path hole 2 and is screwed/fixed therein by a connecting member 7. A flare portion 5a extending from a lock buldged portion 5b of the pipe 5, which opposes the installation space, is a factor for determining the upper limit of the installation space for the filter 40. In addition, a return path hole (denoted by reference symbol 39a in FIG. 3) to the tank side tends to be formed at a position near the lower side of the path hole 2. Therefore, the thickness defined by sizes A and B shown in FIG. 1 must be ensured, thus determining the lower limit of the space. If the path hole 2 bottom portion is perforated to a position indicated by reference symbol C in FIG. 1, the path holes excessively approach each other to decrease the thickness, thus posing a problem.

Furthermore, according to the present invention, the small-diameter portion 40e is formed to be continuous with the tapered portion 40d of the lower ring frame member 40c, and is inserted in the small-diameter path hole 6 with a small pressure so as to prevent dust, foreign substances, and the like from entering the hydraulic reaction system. Assembly of the small-diameter portion 40 described above can be easily performed as compared with a large-diameter frame member used in the conventional structure. As a result, assembly of the filter 40 can be relatively facilitated and properly performed. More specifically, assembly of the cylindrical filter 40 in the path hole 2 is performed as follows. The lower ring frame member 40c is first inserted in the path hole 3 from the above in a loosely fitted state. Only the upper ring frame member 40b is urged in the path hole 2 to be assembled, and the tapered portion 40d of the lower frame member 40c is seated on the tapered stepped outlet portion 2a of the path hole 2 bottom portion so as to cause the small-diameter portion 40e below the tapered portion 40d to oppose the small-diameter path hole 3 which is formed to be continuous with the lower portion of the path hole 2. With this arrangement, the filter 40 can be arranged in the space whose axial length is greatly limited with the maximum filter area of the filter mesh portion 40a being ensured. Especially, according to the present invention, since assembly of the filter 40 is performed by urging only the upper ring frame member 40b in the path hole 2 while the lower ring frame member 40c is loosely fitted in the path hole 2 and the tapered portion 40d is urged against the tapered surface 2a of the path hole bottom portion to be seated thereon, only a small insertion margin is required. Therefore, deformation of the overall filter 40 can be minimized. In addition, positioning of the filter 40 in the axial direction can be easily performed, i.e., this structure is excellent in assembly performance. As is apparent from FIG. 1 and the like, in the embodiment, a stepped portion 40f is formed in the inner surface of the filter 40 at the lower ring frame member 40c side. If a press jig or the like having a portion for urging the stepped portion 40f downward and a portion for urging the upper end of the upper ring frame member 40b is used, insertion of the filter 40 in the path hole 2 is facilitated.

Figure 5:
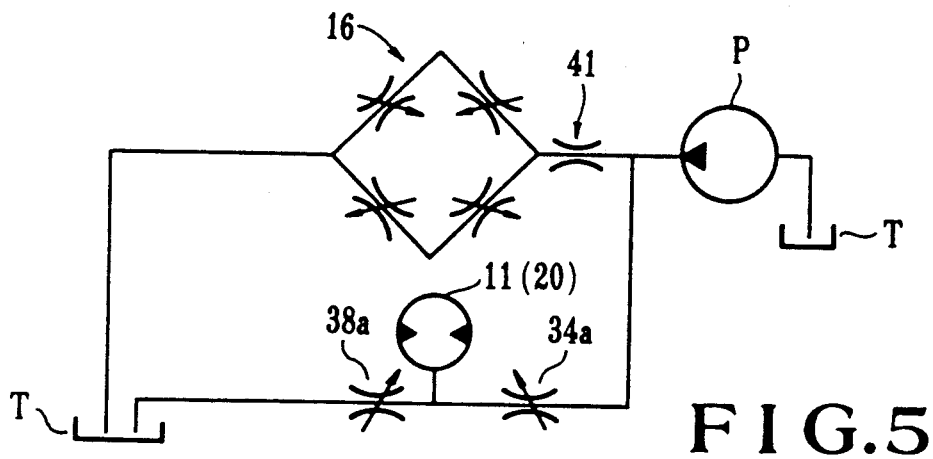
FIG. 5 is a circuit diagram showing a hydraulic circuit.
Figure 3:
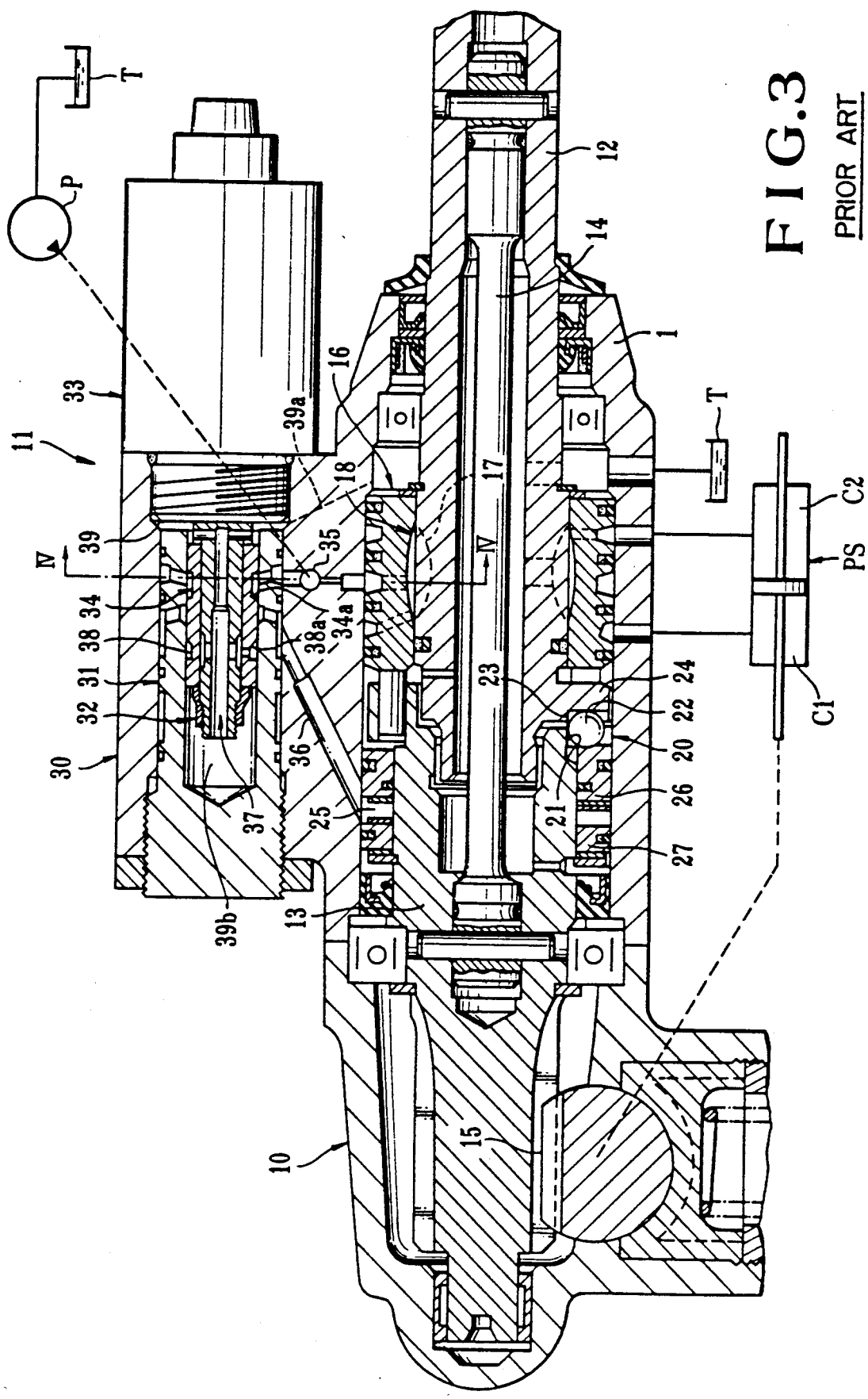
FIG. 3 is a schematic sectional view showing a power steering main body and a steering force control apparatus for a power steering system to which the present invention is applied.

In addition, as is apparent from FIG. 1, according to the present invention, a choke portion 41 capable of choking the main hydraulic path 2 extending from the pump P to the power cylinder PS and applying a constant pressure to the reaction hydraulic system is formed inside the small-diameter portion 40e as the internal flow path outlet side of the filter 40 so as to have a small diameter. More specifically, according to the steering force control apparatus 11 having the above-described arrangement, a desired preset pressure must be applied to the hydraulic reaction chamber 25 through the hydraulic reaction control mechanism 30 during straight or high-speed travel so as to ensure a sense of rigidity of the steering wheel when the gear is in neutral position. For this reason, the above-described choke portion 41 is arranged midway along the main hydraulic path as shown in FIG. 5 and the like so as to apply a constant pressure to the hydraulic reaction system branched from the upstream side. Since the desired preset pressure acts on the reaction piston 24 which is urged against the balls 22 of the hydraulic reaction mechanism 20, each ball 22 can be urged against a corresponding inclined surface of the reaction receiving portion at its deepest position and can be maintained in this state.

Figure 6:
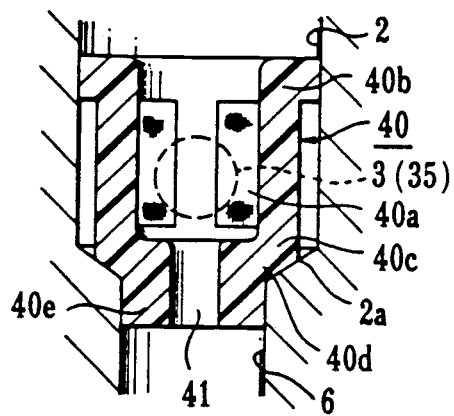
FIGS. 6 to 9 are schematic sectional views respectively showing modifications of the present invention.

If the above-described choke portion 41 is integrally formed with the lower portion of the filter 40, processability and the like can be improved as compared with a case wherein a choke requiring accurate diameter and length is mechanically formed in the body 1 side. In addition, the length and diameter of a choke can be arbitrarily set without degrading the filtration performance. Moreover, in comparison with a case wherein the choke portion 41 is formed at another position, the size of the overall structure can be decreased. Especially, in order to ensure the flow of an oil pressure on the main path side, the inner diameter and axial length of the choke portion 41 are preferably set to be maximum. Thus, the size of each component is preferably set in consideration of these points. In the embodiment described with reference to FIG. 1, the small-diameter outlet side path hole 6 on the body 1 side, which is continuous with the choke portion 41 in the small-diameter portion 40e is also utilized as a choke portion. However, the present invention is not limited to this. For example, as shown in FIG. 6, the path hole 6 side may have a large diameter, and the choke portion 41 with a necessary length may be formed on the small-diameter portion 40e side (filter internal path outlet side). If the choke portion 41 is formed on the outlet side of the internal path of the filter 40 as a tapered hole whose diameter is gradually increased toward the outlet side of the main path, noise can be suppressed, which poses a problem when the choke portion 41 is formed on the main path. Especially, when the filter 40 of this type is to be formed as a molded resin product, the draft of the mold can be conveniently used for formation of the above-described tapered hole.

Figure 7:
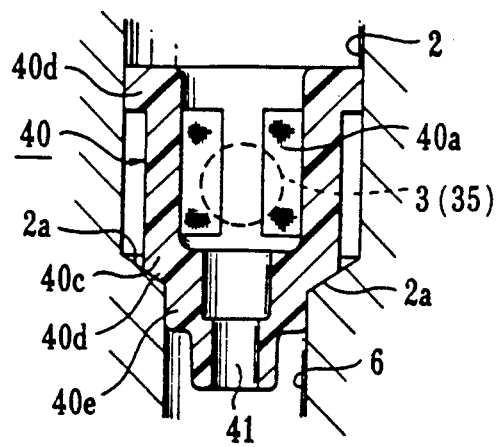
Figure 8:
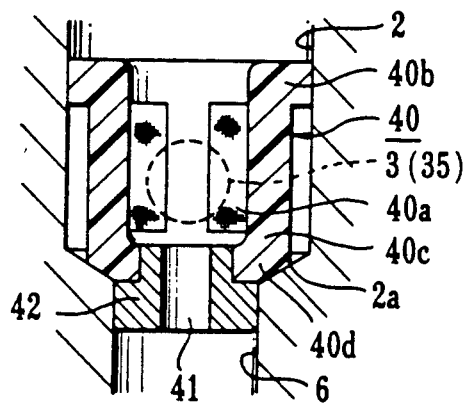
Figure 9:
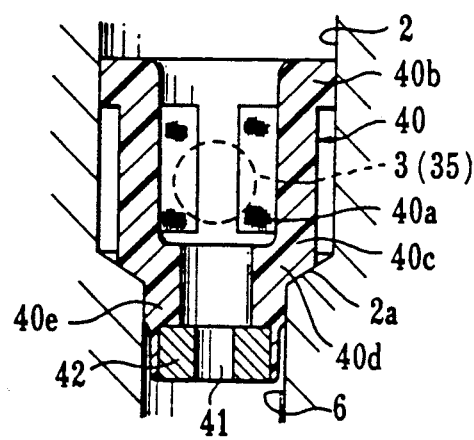
Figure 10:
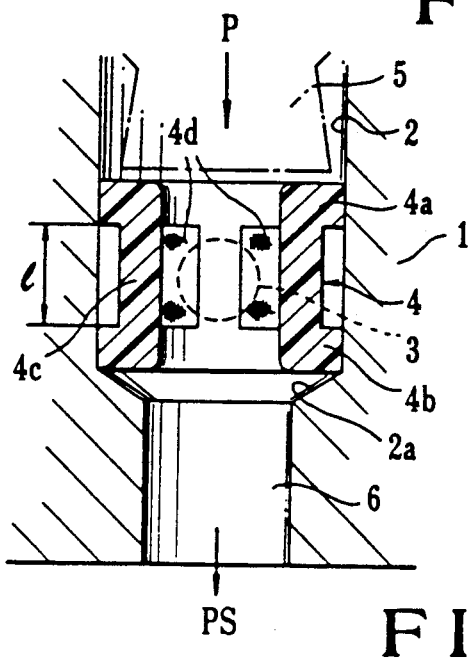
FIG. 10 is a schematic sectional view for explaining a conventional apparatus.

When the above-described choke 41 is to be integrally formed with the resin filter 40, the small-diameter portion 40e may be deformed upon insertion in the outlet side path hole 6 or the like, and the diameter of the choke portion 41 may vary. Therefore, a countermeasure against this may be required. In such a case, as shown in FIG. 7, the choke portion 41 may be formed at only a small-diameter distal end portion of the small-diameter portion 40e which is formed not to be urged into the path hole 6. In addition, as shown in FIG. 8, a portion to be urged in the path hole 6 may be constituted by a metal ring member 42 integrally formed with the filter 40 by insert molding or the like, and the choke portion 41 may be formed in this portion. Moreover, as shown in FIG. 9, the metal ring member 42 having the choke portion 41 may be integrally formed with the distal end of the small-diameter portion 40e, which is formed not to be urged in and deformed.

The present invention is not limited to the structures in the above-described embodiment, and the shapes, structures, and the like of the respective components can be arbitrarily changed and modified as needed. In the above embodiment, a schematic arrangement of the steering force control apparatus 11 as an apparatus constituted by the hydraulic reaction mechanism 20 and the hydraulic reaction control mechanism 30 is described. However, the present invention is not limited to this, and various changes and modifications can be made. In addition, various types of power steering systems can be employed.

As has been described above, the steering force control apparatus for a power steering system according to the present invention comprises a cylindrical filter arranged on the bottom side of a path hole serving as a main path and having a mesh portion, formed on its outer surface, for filtering a pressurized oil flowing to a branch path on the hydraulic reaction side which is open to the wall of the path. The cylindrical filter is constituted by upper and lower ring frame members fitted in the path hole, and the outer diameter of the lower ring frame member is set to be small. A tapered portion is formed so as to be inclined inwardly and seated on the bottom portion of the path hole, and a small-diameter portion is formed to be continuous with the tapered portion and oppose a small-diameter path hole formed at the lower side of the path hole. In addition, since a choke portion is integrally formed with the filter internal path outlet side as needed, the following excellent practical effects can be obtained in spite of a simple and low-cost arrangement:

(1) The filter area of the cylindrical filter arranged in the space limited in the axial direction can be increased as compared with the conventional structure.

(2) Since the volume of the annular space formed outside the filter mesh portion can be increased, a pressure loss of an oil pressure transmitted to the hydraulic reaction system can be minimized as compared with the conventional structure.

(3) Since assembly of the filter is performed by urging only the upper ring frame member in the path hole while the lower ring frame member is loosely fitted in the path hole and its tapered portion is urged against the tapered surface of the bottom portion of the path hole to be seated thereon, deformation of the filter itself can be suppressed, and positioning in the axial direction is facilitated. Hence, the structure is excellent in assembly performance.

(4) By integrally forming the choke portion with the lower portion of the filter, the length and diameter of the choke can be arbitrarily set without degrading the filtration performance. A preset pressure required on the hydraulic reaction side can be obtained without interfering with the flow of a pressurized oil on the main hydraulic path side. In addition, a perforation process with respect to the body side, which requires high precision and a large space, can be omitted.

What is claimed is:

1. A steering force control apparatus for a power steering system, comprising:
   a main hydraulic path hole extending from a pump to a power steering side, said main hydraulic path hole having a tapered stepped outlet portion;
   a branch path hole having one end open to said said main hydraulic path hole midway along said main hydraulic path hole and extending to a hydraulic reaction mechanism; and
   a cylindrical filter located along the main hydraulic path hole, said filter having a through bore and a mesh portion for filtering pressurized oil, said mesh portion being formed at a first portion of said filter at which said main hydraulic path hole communicates with said branch path hole,
   said filter having a tapered portion located along said main hydraulic path hole downstream of said branch path hole, and
   said filter having upper and lower ring frame members joined by said first filter portion, said upper ring frame member having an outer diameter sized so as to provide a press fit within said main hydraulic path hole wherein the portion of the through bore in the vicinity of the lower ring frame member constitutes a filter outlet portion, said lower ring frame member and said first filter portion having an outer diameter smaller than that of said upper ring frame member to form an elongated annular space located between said mesh portion and said main hydraulic path hole, and said tapered portion of said lower ring frame member being positioned in registration with the tapered stepped outlet portion of said main hydraulic path hole so that said filter permits some of the pressurized oil to flow along said main hydraulic path hole through said filter through bore to the outlet portion thereof and the remainder of the pressurized oil to pass through said mesh portion and the annular space to said branch path hole.

2. An apparatus according to claim 1, wherein said filter outlet portion has a reduced diameter for providing a fluid choke function.

3. An apparatus according to claim 2 wherein said filter outlet portion of said throughbore includes first and second inner wall portions of different inner diameter values.

4. An apparatus according to claim 1 wherein said filter includes a choke portion secured to said tapered portion and having an inner diameter smaller than the inner diameter of said throughbore.

5. An apparatus according to claim 1 wherein said tapered portion of said filter includes a tapered portion formed integrally with said first portion and a small diameter portion secured thereto.

* * * * *